Patented Feb. 26, 1952

2,586,928

UNITED STATES PATENT OFFICE 2,586,928

SEPARATION OF OXYGEN-CONTAINING CHEMICAL COMPOUNDS

Harold W. Fleming, Bartlesville, Okla., assignor to Phillips Petroleum Company, a corporation of Delaware No Drawing. Application January 4, 1949, Serial No. 69,233

11 Claims. (Cl. 260—488)

This invention relates to a method for resolving mixtures of close-boiling, difficultly separable organic compounds. In one embodiment this invention relates to a method for resolving mixtures of oxygenated hydrocarbon derivatives that are not readily resolved by ordinary fractionation means. In a specific aspect this invention relates to a method for resolving close-boiling mixtures of aldehydes, ketones, esters and alcohols resulting from the hydrogenation of an oxide of carbon.

In the catalytic hydrogenation of a carbon oxide, a product comprising various hydrocarbons and oxygen-containing hydrocarbon derivatives is obtained in relative yields dependent upon the choice of catalyst and of hydrogenation conditions. For example, hydrogen and carbon monoxide may be passed into a catalytic zone containing an iron catalyst suitable for the production of hydrocarbons as the principal reaction product. During the reaction minor amounts of oxygen-containing compounds, water and carbon dioxide are also formed. A water-rich phase and a normally liquid hydrocarbon-rich phase can be separated from the total product, throughout which are distributed oxygen-containing compounds. These oxygen-containing compounds comprise chiefly alcohols, aldehydes, acids, ketones and esters boiling in a moderate temperature range, together with relatively minor amounts of higher molecular weight compounds. In numerous instances it is difficult to resolve fractions of the oxygenated products boiling within a relatively narrow range into the respective components of the fraction because of the close proximity of the boiling points of the components and because of the tendency of the components to form azeotropes and acetates.

It is an object of this invention to provide a novel method for the resolution of mixtures of difficultly separable oxygenated organic compounds.

It is another object of this invention to provide a novel method for the resolution of difficultly separable fractions of oxygenated organic compounds obtained from the hydrogenation of a carbon dioxide.

It is a further object of this invention to provide a novel method for the resolution of mixtures of difficultly separable oxygenated organic compounds wherein one of said compounds is either an alcohol or an acetate and wherein another of said compounds is either an aldehyde or a ketone.

It is a further object of this invention to provide a novel method for the resolution of difficultly separable fractions of oxygenated products obtained from the catalytic hydrogenation of carbon monoxide said products comprising alcohols, acetates, aldehydes and ketones.

Additional objects will be readily apparent from the accompanying discussion and disclosure.

I have found that mixtures of oxygenated organic compounds, which are difficultly separable by ordinary fractionation means and which contain an alcohol and/or an acetate and an aldehyde and/or ketone, can be resolved by conversion of the alcohol and/or acetate content of the mixture to a formate, followed by separation of the resulting mixture by conventional means.

Although I will describe my invention in detail as applicable to specific mixtures of oxygenated products resulting from the catalytic hydrogenation of carbon monoxide, my invention can be applied to other mixtures of difficultly separable oxygenated organic compounds, and these mixtures may be derived from any suitable source. It is not essential to my process that the mixtures be obtained from the products of the reaction between hydrogen and carbon monoxide, but in a specific and preferred embodiment of my invention I obtain the mixtures from that source.

A specific mixture that may be used in my process contains n-butyraldehyde, methyl ethyl ketone, ethyl acetate, ethyl alcohol and water. Hereinafter this mixture will be designated as the butyraldehyde mixture. A study of the binary and ternary azeotropic mixtures formed by the compounds contained in this butyraldehyde mixture indicates the difficulty of resolving this butyraldehyde mixture by normal fractionating procedures. The compounds in this mixture form the following azeotropes:

| Component | Weight Per Cent | Component | Weight Per Cent | Component | Weight Per Cent | Boiling Point, °C. |
|---|---|---|---|---|---|---|
| Water | 8.2 | Ethyl acetate | 91.8 | | | 70.4 |
| Do | 6.0 | n-butyraldehyde | 94 | | | 68 |
| Do | 7.8 | Ethyl alcohol | 9.0 | Ethyl Acetate | 83.2 | 70.3 |
| Do | 11.0 | Methyl ethyl ketone | 89.0 | | | 73.45 |
| Ethanol | 40.0 | Do | 60.0 | | | 74.8 |
| Do | 31.0 | Ethyl acetate | 69.0 | | | 71.8 |

It is a further object of this invention to pro-    In addition to the formation of the above close-boiling azeotropes, n-butyraldehyde reacts with ethyl alcohol to form a hemiacetal and an acetal in accordance with the following equations:

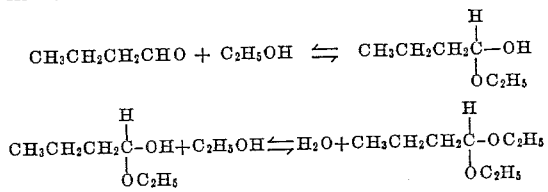

the hemiacetal and acetal formation increases the diffiulty of resolving the butyraldehyde mixture.

Another specific mixture that may be used in my process contains propionaldehyde, acetone, methanol and methyl acetate. Hereinafter this mixture will be designated as the propionaldehyde mixture. A study of the boiling points of propionaldehyde and of the azeotropic mixtures formed by the compounds contained in this propionaldehyde mixture indicates the difficulty of separating this propionaldehyde mixture by normal fractionating procedures.

| Component | Weight Per Cent | Component | Weight Cent Per | Component | Weight Per Cent | Boiling Point,°C. |
|---|---|---|---|---|---|---|
| Methyl acetate | 81 | Methanol | 19 | | | 54 |
| Do | 0.5 | do | 4.5 | Acetone | 95 | 53.9 |
| Propionaldehyde | | | | | | 49.5 |

Since the propionaldehyde is highly reactive, the methanol and propionaldehyde react in accordance with the following equations to make extremely difficult the separation of propionaldehyde by normal fractionation procedures.

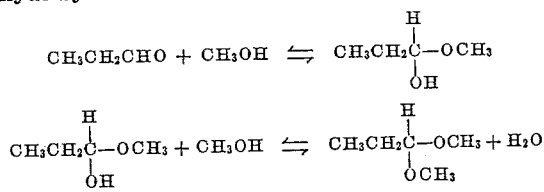

In accordance with my invention mixtures, such as the butyraldehyde and propionaldehyde mixtures named hereinabove, are resolved by adding formic acid to the mixture in a quantity stoichiometrically equivalent to the alcohol and acetate content of the mixture. The alcohol and acetate are converted to the corresponding formate with the resultant formation of water and acetic acid, and the resulting mixture is readily separable by conventional means.

For example, when using the butyraldehyde mixture, I convert the ethanol and ethyl acetate to ethyl formate. This latter compound has a boiling point of 54.3° C. at standard conditions, and consequently it is readily removable from the mixture by simple distillation. With the ethanol and ethyl acetate removed, the resulting mixture consisting of n-butyraldehyde, methyl ethyl ketone, water and acetic acid is separable by conventional means. The butyraldehyde and water azeotrope boils at 68° C., the methyl ethyl ketone and water azeotrope boils at 73° C., and the acetic acid boils at 118.1° C.

As another example, when using the propionaldehyde mixture, I convert the methanol and methyl acetate to methyl formate. This latter compound has a boiling point of 31.5° C. at standard conditions, and it is readily removable from the mixture by simple distillation. The formation and removal of the methyl formate precludes the possibility of hemiacetal or acetal formation, and the resulting mixture consisting of propionaldehyde, acetone, acetic acid and water is separable by conventional means.

In my process I effect the formation of formates by addition of formic acid to the mixture to be resolved. The formic acid reacts with the alcohols and acetates to produce the corresponding formates. I prefer to use no more formic acid than that quantity which is required to react with the alcohols and acetates, but as much as 2.5 times that amount of formic acid may be used, if desired. Formic acid in excess of a stoichiometric equivalent of the alcohols and acetates causes decomposition of the aldehyde content of the mixture, and the amount of decomposition increases as the excess of formic acid is increased. I have also found that the best results are obtained in my process if a very small concentration of a mineral acid, such as sulfuric acid, hydrochloric acid, and the like, is used to catalyze the reaction. The concentration of the acid should be within the range of 0.01 to 10 liquid volume per cent of the total mixture. I prefer to use the smallest amount that will catalyze the reactions to form the formate. For example, four drops of concentrated sulfuric acid in 200 milliliters of the butyraldehyde mixture is sufficient to catalyze the reactions.

The mixture of compounds that is obtained when practicing my invention are readily separable. This fact is evident from a consideration of the boiling points of the various compounds and their azeotropes. For example, the products resulting from the addition of formic acid to the butyraldehyde mixture have the following boiling points:

° C.
Ethyl formate _____ 54.3
Butyraldehyde-water azeotrope _____ 68
Methyl ethyl ketone-water azeotrope ____ 73.45
Water _____ 100
Acetic acid _____ 118.1

This mixture can be separated with relative ease by a simple distillation process.

If it is desired to obtain the alcohol and acetate as products of my process, the formate, after separation from the other compounds, may be treated in any manner within the skill of the art to produce the alcohol and acetate. For example, after introducing formic acid to the butyraldehyde mixture, ethyl formate may be separated by distillation. The ethyl formate thus obtained may then be saponified with sodium hydroxide to produce ethanol. Any portion or all of the ethanol may be reacted with acetic acid to produce ethyl acetate, as desired. If an ethyl ester other than ethyl acetate is desired, ethanol may be reacted with an organic acid, such as propionic acid, butyric acid, and the like, that will produce the desired ester.

In a specific embodiment of my invention, the formate-forming reaction and a partial separation of the products of my process may be effected in a rectifying column. The mixture of oxygenated compounds to be resolved, such as the butyraldehyde mixture, is introduced to the rectifying column at a point below the center and near the bottom of the column. The formic acid with a small amount of sulfuric acid to catalyze the reaction is introduced above the center and near the top of the column. Countercurrent contact and efficient intermixing of the two streams is thus effected. The column is operated in a manner that an overhead product stream is withdrawn at about 80° C., and any portion of this stream may be refluxed, as desired. The overhead product from the column contains ethyl formate, butyraldehyde-water azeotrope and methyl ethyl ketone-water azeotrope, and these products may be separated by simple distillation. If desired, the ethyl formate may be reconverted to ethanol and ethyl acetate as described hereinabove. The kettle product from the column contains water, formic acid and acetic acid. The water is separated by azeotropic distillation with an entrainer such as benzene, and the acetic acid and formic acid are separated by an additional distillation.

The following non-limiting examples are illustrative of my invention:

EXAMPLE 1

To a known mixture of 60 milliliters of acetone, 3 milliliters of methanol, 3 milliliters of methyl acetate and 34 milliliters of propionaldehyde was added 10 milliliters of 87 per cent formic acid, a slight excess over the amount required to react with the methanol and methyl acetate, and four drops of concentrated sulfuric acid. 100 milliliters of water was added to serve as a chaser. This mixture was charged to a 13 millimeter by 36 inch Hypercal column and fractionated to recover methyl formate, propionaldehyde and acetone in pure fractions overhead with acetic acid remaining in the kettle. The recovery was greater than 95 per cent of theoretical.

EXAMPLE 2

To a known mixture containing:

| | Milliliters |
|---|---|
| Acetone | 60 |
| Methanol | 3 |
| Methyl acetate | 3 |
| Propionaldehyde | 34 | was added 16 milliliters of 87 per cent formic acid, about twice the amount required to react with the methanol and methyl acetate, and four drops of concentrated sulfuric acid. This mixture was charged to a 13 millimeter by 36 inch Hypercal column and fractionated to recover methyl formate and 70 per cent of the propionaldehyde. The use of excess formic acid, without dilution with water, over that required to react with the methanol and methyl acetate resulted in decomposition of 30 per cent of the propionaldehyde.

EXAMPLE 3

To a known mixture containing:

| | Milliliters |
|---|---|
| Methyl ethyl ketone | 75 |
| n-Butyraldehyde | 30 |
| Ethyl acetate | 9.8 |
| Ethanol | 11.6 |
| Water | 20.0 | was added 14 milliliters of 87 per cent formic acid and four drops of concentrated sulfuric acid. This mixture was charged to a 13 milliliter by 36 inch Hypercal column and fractionated to recover ethyl formate and n-butyraldehyde. When most of the aldehyde had been removed overhead, an additional 50 milliliters of water was added to the kettle to serve as a chaser. The fractionation was then continued to recover additional n-butyraldehyde and methyl ethyl ketone as water azeotropes overhead. The recovery was greater than 95 per cent of theoretical, and there was no indication of decomposition of the material charged.

From the above disclosure and examples variations of my invention which do not depart from its scope will be apparent to those skilled in the art.

I claim:

1. A method for resolving a mixture of difficultly separable close-boiling, oxygenated organic compounds, said mixture containing at least one oxygenated organic compound selected from the group consisting of acetates and alcohols and at least one oxygenated organic compound selected from the group consisting of aldehydes and ketones which comprises adding formic acid to said mixture so as to convert any acetates and alcohols therein to the corresponding formate and separating the components of the thus-produced mixture by distillation.

2. A method for resolving a mixture of difficultly separable, close-boiling oxygenated organic compounds, said mixture containing acetates, alcohols, aldehydes and ketones, which comprises adding formic acid to said mixture to convert said acetates and alcohols to corresponding formates and separating the components of the thus-produced mixture by distillation.

3. A method for resolving a mixture of difficultly separable, close-boiling oxygenated organic compounds, said mixture containing acetates, alcohols, aldehydes and ketones, which comprises adding formic acid and a strong mineral acid to said mixture to convert said acetates and alcohols to corresponding formates and separating from the resulting mixture aldehyde and ketone fractions free of acetates and alcohols by distillation.

4. A method for resolving a mixture of difficultly separable, close-boiling oxygenated organic compounds obtained from catalytic hydrogenation of a carbon oxide, said mixture containing acetates, alcohols, aldehydes and ketones, which comprises adding to said mixture formic acid in a quantity stoichiometrically not in excess of said acetates and alcohols and a strong mineral acid to convert said acetates and alcohols to corresponding formates and separating from the resulting mixture aldehyde and ketone fractions free of acetates and alcohols by distillation.

5. A method according to claim 4 wherein said strong mineral acid is sulfuric acid in a concentration within the range of 0.01 to 10 liquid volume per cent of the total mixture.

6. A method according to claim 4 wherein the mixture to be resolved contains n-butyraldehyde, methyl ethyl ketone, ethyl acetate, ethyl alcohol and water.

7. A method according to claim 4 wherein the mixture to be resolved contains propionaldehyde, acteone, methanol and methyl acetate.

8. A method for resolving a mixture of n-butyraldehyde, methyl ethyl ketone, ethyl acetate, ethyl alcohol and water, obtained from catalytic hydrogenation of carbon monoxide, which comprises introducing to said mixture formic acid in a quantity stoichiometrically equivalent to said ethyl acetate and ethyl alcohol and sulfuric acid in a quantity sufficient to catalyze the reaction of said formic acid with said ethyl acetate and ethyl alcohol, and separating from the resulting mixture by distillation n-butyraldehyde and methyl ethyl ketone fractions free of ethyl acetate and ethyl alcohol.

9. A method for resolving a mixture of propionaldehyde, acetone, methanol and methyl acetate, obtained from catalytic hydrogenation of carbon monoxide, which comprises introducing to said mixture formic acid in a quantity stoichiometrically equivalent to said methanol and methyl acetate and sulfuric acid in a quantity sufficient to catalyze the reaction of said formic acid with said methanol and methyl acetate, and separating from the resulting mixture by distillation propionaldehyde and acetone fractions free of methanol and methyl acetate.

10. The process for resolving a mixture of acetates, alcohols, aldehydes, ketones, and water which comprises introducing said mixture into the lower end of a rectifying column; introducing into the upper end of said column formic acid stoichiometrically equivalent to the alcohol and acetate therein, together with a strong mineral acid in an amount regulated to maintain same in the range of 0.01 to 10 liquid volume per cent of the total mixture in the column; maintaining reaction conditions in said column so as to react said acetates and alcohols with said formic acid and convert same to the corresponding formates; recovering an overhead fraction from said column comprising the formates thus formed, aldehyde-water azeotrope and ketone-water azeotrope; and separating said overhead fraction into its components by distillation.

11. A process for resolving a mixture of n-butyraldehyde, methyl ethyl ketone, ethyl acetate, ethyl alcohol, and water which comprises introducing said mixture into the lower end of a rectifying column; introducing into the upper end of said column formic acid stoichiometrically equivalent to the alcohol and acetate therein, together with sulfuric acid; regulating the amount of sulfuric acid in the column so as to maintain the same in the range of 0.01 to 10 liquid volume per cent of the total mixture in the column; maintaining reaction conditions in said column so as to react said ethyl acetate and ethyl alcohol with said formic acid and convert same to ethyl formate; recovering an overhead fraction from said column comprising ethyl formate, butyraldehyde-water azeotrope and methyl ethyl ketone-water azeotrope; and separating said overhead fraction into its components by distillation.

HAROLD W. FLEMING.

REFERENCES CITED

The following references are of record in the file of this patent:

UNITED STATES PATENTS

| Number | Name | Date |
|---|---|---|
| 2,433,323 | Reiter | Dec. 23, 1947 |

OTHER REFERENCES

Karrer: "Organic Chemistry," 2d English ed. (Elsevier Pub. Co., New York, 1946) p. 152.